(12) United States Patent
Derbanne et al.

(10) Patent No.: US 11,050,972 B1
(45) Date of Patent: Jun. 29, 2021

(54) SYSTEMS AND METHODS FOR GENERATING TIME-LAPSE VIDEOS

(71) Applicant: GoPro, Inc., San Mateo, CA (US)

(72) Inventors: Thomas Derbanne, Paris (FR); Maxim Karpushin, Paris (FR); Nicolas Rahmouni, San Mateo, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 16/827,372

(22) Filed: Mar. 23, 2020

Related U.S. Application Data

(60) Provisional application No. 62/897,535, filed on Sep. 9, 2019, provisional application No. 62/869,711, filed on Jul. 2, 2019.

(51) Int. Cl.
*H04N 5/262* (2006.01)
*H04N 7/01* (2006.01)
*G06T 7/269* (2017.01)

(52) U.S. Cl.
CPC .......... *H04N 7/0127* (2013.01); *G06T 7/269* (2017.01); *H04N 5/2628* (2013.01); *G06T 2207/10016* (2013.01); *G06T 2207/30244* (2013.01)

(58) Field of Classification Search
CPC ..................................................... H04N 5/783
See application file for complete search history.

(56) References Cited

U.S. PATENT DOCUMENTS

| 10,593,363 B2 * | 3/2020 | Derbanne ............ H04N 5/2621 |
| 10,916,272 B2 * | 2/2021 | Derbanne ............ H04N 5/2621 |
| 2014/0105564 A1 * | 4/2014 | Johar ...................... H04N 9/79 386/226 |
| 2015/0248916 A1 * | 9/2015 | Kopf ....................... G06T 5/002 386/278 |
| 2016/0004390 A1 * | 1/2016 | Laska ................. H04N 21/2187 715/723 |
| 2016/0269648 A1 * | 9/2016 | Hayashi ............ H04N 5/23206 |
| 2018/0184063 A1 * | 6/2018 | Burgess ................. G01C 11/02 |
| 2018/0184073 A1 * | 6/2018 | Burgess ................ B64C 39/024 |
| 2020/0185005 A1 * | 6/2020 | Derbanne ............ G11B 27/031 |

* cited by examiner

*Primary Examiner* — Paulos M Natnael
(74) *Attorney, Agent, or Firm* — Esplin & Associates, PC

(57) ABSTRACT

Positions of an image capture device may be used to estimate a time-lapse video frame rate with which time-lapse video frames are generated. The time-lapse video frame rate may be adjusted based on apparent motion between pairs of generated time-lapse video frames. The adjusted time-lapse video frame rate may be used to generate additional time-lapse video frames.

20 Claims, 10 Drawing Sheets

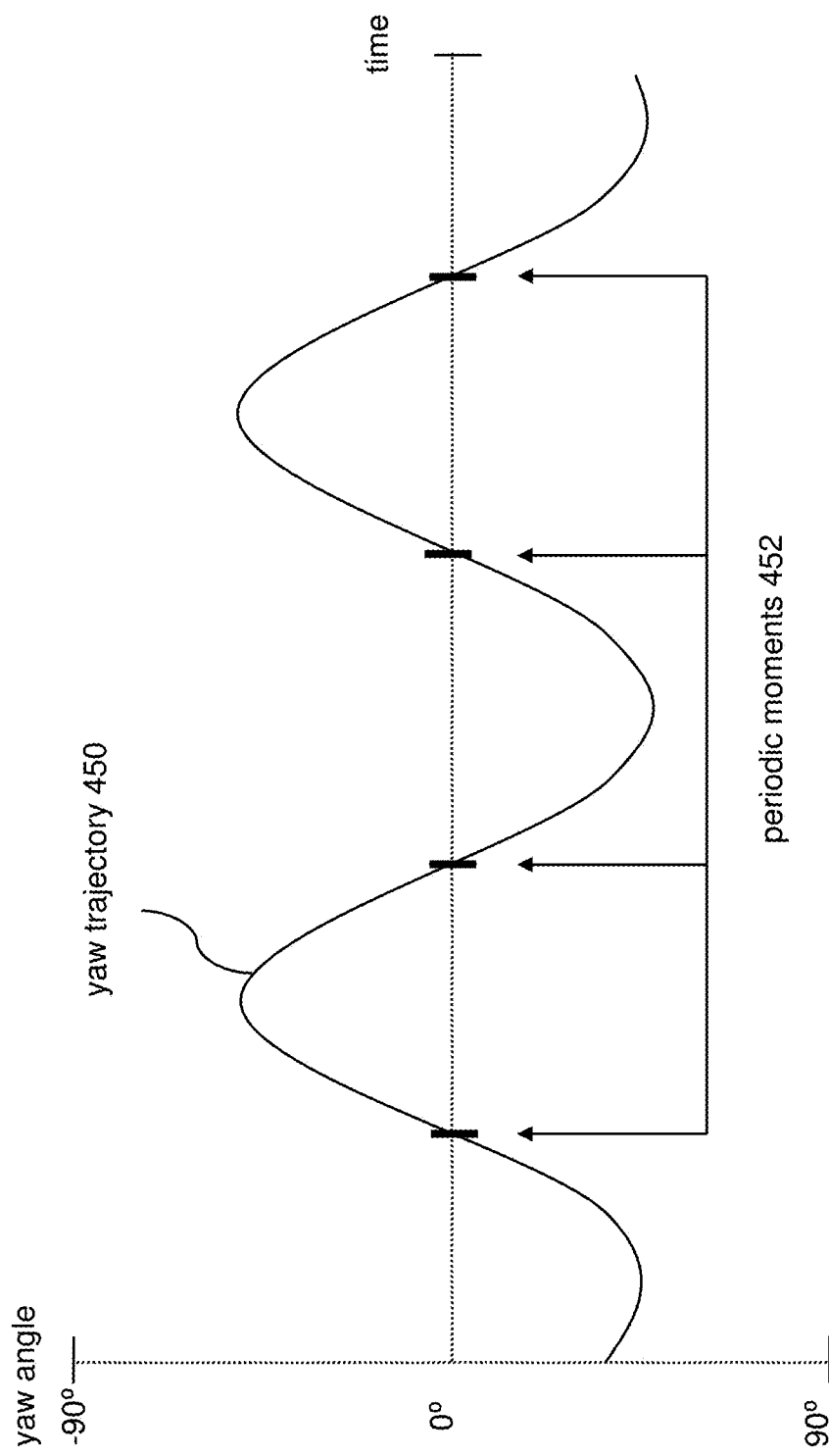

capture duration capture duration

SYSTEMS AND METHODS FOR GENERATING TIME-LAPSE VIDEOS

FIELD

This disclosure relates to generating time-lapse videos using dynamic time-lapse video frame rates.

BACKGROUND

A time-lapse video may provide a sped-up view of captured images. Using a fixed sped-up rate in generating the time-lapse video may provide a hectic and unpleasant view of the captured images.

SUMMARY

This disclosure relates to generating time-lapse videos. Visual information, position information of an image capture device, and/or other information may be obtained. The visual information may define visual content captured by the image capture device during a capture duration. The position information of the image capture device may characterize positions of the image capture device during the capture duration. A time-lapse video frame rate may be determined based on the position information and/or other information. The time-lapse video frame rate may define a rate at which time-lapse video frames are generated based on the visual content. The time-lapse video frames may include a first time-lapse video frame generated based on the visual content captured by the image capture device at a first moment within the capture duration, a second time-lapse video frame captured by the image capture device at a second moment subsequent to the first moment within the capture duration, and/or other time-lapse video frames.

Apparent motion information and/or other information may be obtained. The apparent motion information may characterize apparent motion between pairs of two or more of the time-lapse video frames. The apparent motion information may characterize first apparent motion between the first time-lapse video frame and the second time-lapse video frame, and/or other apparent motion between other time-lapse video frames. The time-lapse video frame rate may be adjusted based on the apparent motion information and/or other information. The time-lapse video frames may be generated based on the time-lapse video frame rate and/or other information.

A system that generates time-lapse videos may include one or more electronic storages, one or more processors, and/or other components. An electronic storage may store visual information, information relating to visual content, position information, information relating to positions of an image capture device, information relating to the image capture device, information relating to time-lapse video frame rate, apparent motion information, information relating to apparent motion between pairs of time-lapse lapse video frames, information relating to adjustment of time-lapse video frames, information relating to generation of video frames, and/or other information. In some implementations, the system may include one or more optical elements, one or more image sensors, one or more position sensors, and/or other components.

One or more components of the system may be carried by a housing, such as a housing of an image capture device. For example, the optical element(s), the image sensor(s), and/or the position sensor(s) of the system may be carried by the housing of an image capture device. The housing may carry other components, such as the processor(s) and/or the electronic storage.

The processor(s) may be configured by machine-readable instructions. Executing the machine-readable instructions may cause the processor(s) to facilitate generating time-lapse videos. The machine-readable instructions may include one or more computer program components. The computer program components may include one or more of a visual information component, a position information component, a frame rate component, an apparent motion information component, an adjustment component, a generation component, and/or other computer program components.

The visual information component may be configured to obtain visual information and/or other information. The visual information may define visual content of one or more images. The visual content may be captured by an image capture device during a capture duration.

The position information component may be configured to obtain position information of the image capture device and/or other information. The position information may characterize positions of the image capture device during the capture duration. In some implementations, the position information may characterize the positions of the image capture device during the capture duration based on the position information including rotational position information, translational position information, and/or other position information. The rotational position information may characterize rotational positions of the image capture device during the capture duration. The translational position information may characterize translational positions of the image capture device during the capture duration.

In some implementations, the position information may characterize the positions of the image capture device during the capture duration further based on the position information including acceleration information and/or other information. The acceleration information may characterize accelerations of the image capture device during the capture duration.

The frame rate component may be configured to determine a time-lapse video frame rate based on the position information and/or other information. The time-lapse video frame rate may define a rate at which time-lapse video frames are generated based on the visual content. The time-lapse video frames may include a first time-lapse video frame generated based on the visual content captured by the image capture device at a first moment within the capture duration, a second time-lapse video frame captured by the image capture device at a second moment subsequent to the first moment within the capture duration, and/or other time-lapse video frames captured by the image capture device at other moments within the capture duration.

In some implementations, determination of the time-lapse video frame rate based on the position information may include: (1) identification of one or more motion types of the image capture device based on the position information and/or other information; and (2) determination of the time-lapse video frame rate based on the motion type(s) of the image capture device and/or other information.

In some implementations, determination of the time-lapse video frame rate based on the position information may include: (1) determination of an amount of field of view overlap between the visual content captured at different moments within the capture duration based on the position information and/or other information; and (2) determination of the time-lapse video frame rate based on the amount of field of view overlap between the visual content captured at different moments within the capture duration and/or other information.

In some implementations, the time-lapse video frame rate may be initially determined based on an environment in which the visual content is initially captured by the image capture device and/or other information. In some implementations, the environment in which the visual content is initially captured by the image capture device may be determined based on one or more of an exposure, a white balance, and/or a scene classification of the visual content initially captured by the image capture device.

The apparent motion information component may be configured to obtain apparent motion information and/or other information. The apparent motion information may characterize apparent motion between pairs of two or more of the time-lapse video frames. The apparent motion information may characterize first apparent motion between the first time-lapse video frame and the second time-lapse video frame, and/or other apparent motion between other time-lapse video frames. In some implementations, the apparent motion information may be determined based on optical flow between the pairs of the two or more of the time-lapse video frames and/or other information.

The adjustment component may be configured to adjust the time-lapse video frame rate based on the apparent motion information and/or other information. Adjustment of the time-lapse video frame rate may include increase of the time-lapse video frame rate. For example, based on the apparent motion between a pair of time-lapse video frames exceeding a threshold, the time-lapse video frame rate determined based on the position information may be increased.

The generation component may be configured to generate the time-lapse video frames based on the time-lapse video frame rate and/or other information. In some implementations, generation of the time-lapse video frames based on the time-lapse video frame rate may include capture of the time-lapse video frames by the image capture device based on the time-lapse video frame rate and/or other information. In some implementations, at least some of the time-lapse video frames may be stabilized based on a punchout of the at least some of the time-lapse video frames.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

BRIEF DESCRIPTION OF THE DRAWINGS

FIGS. 4A and 4B illustrate example trajectories of an image capture device.

DETAILED DESCRIPTION

Figure 1:
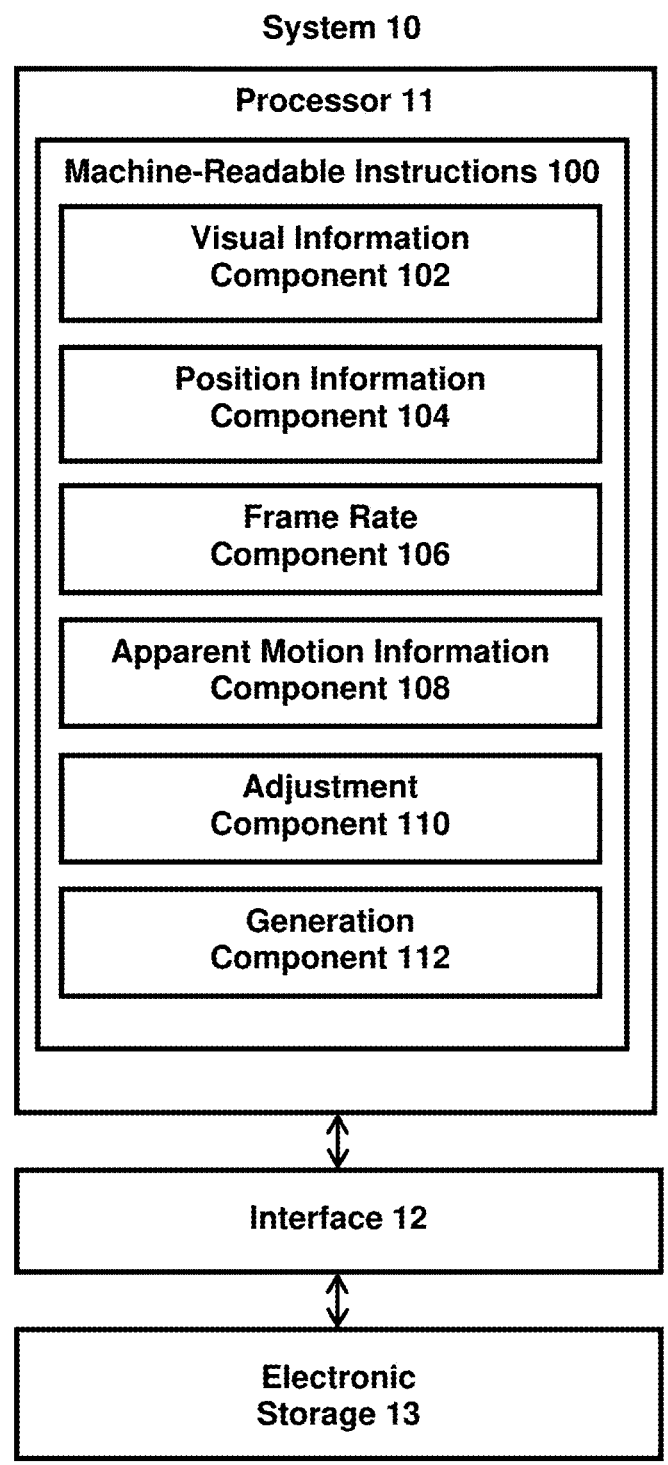
FIG. 1 illustrates an example system that generates time-lapse videos.

FIG. 1 illustrates a system 10 for generating time-lapse videos. The system 10 may include one or more of a processor 11, an interface 12 (e.g., bus, wireless interface), an electronic storage 13, and/or other components. In some implementations, the system 10 may include one or more optical elements, one or more image sensors, one or more position sensors, and/or other components. Visual information, position information of an image capture device, and/or other information may be obtained by the processor. The visual information may define visual content captured by the image capture device during a capture duration. The position information of the image capture device may characterize positions of the image capture device during the capture duration. A time-lapse video frame rate may be determined by the processor 11 based on the position information and/or other information. The time-lapse video frame rate may define a rate at which time-lapse video frames are generated based on the visual content. The time-lapse video frames may include a first time-lapse video frame generated based on the visual content captured by the image capture device at a first moment within the capture duration, a second time-lapse video frame captured by the image capture device at a second moment subsequent to the first moment within the capture duration, and/or other time-lapse video frames.

Apparent motion information and/or other information may be obtained by the processor 11. The apparent motion information may characterize apparent motion between pairs of two or more of the time-lapse video frames. The apparent motion information may characterize first apparent motion between the first time-lapse video frame and the second time-lapse video frame, and/or other apparent motion between other time-lapse video frames. The time-lapse video frame rate may be adjusted by the processor 11 based on the apparent motion information and/or other information. The time-lapse video frames may be generated by the processor 11 based on the time-lapse video frame rate and/or other information.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store visual information, information relating to visual content, position information, information relating to positions of an image capture device, information relating to the image capture device, information relating to time-lapse video frame rate, apparent motion information, information relating to apparent motion between pairs of time-lapse lapse video frames, information relating to adjustment of time-lapse video frames, information relating to generation of video frames, and/or other information.

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate generating time-lapse videos. The machine-readable instructions 100 may include one or more computer program components. The machine-readable instructions 100 may include one or more of a visual information component 102, a position information component 104, a frame rate component 106, an apparent motion information component 108, an adjustment component 110, a generation component 112, and/or other computer program components.

Visual content may refer to content of image(s), video frame(s), and/or video(s) that may be consumed visually. For example, visual content may be included within one or more images and/or one or more video frames of a video. The video frame(s) may define the visual content of the video. That is, video may include video frame(s) that define the visual content of the video. Video frame(s) may define visual content viewable as a function of progress through the progress length of the video content. A video frame may include an image of the video content at a moment within the progress length of the video.

Visual content (of image(s), of video frame(s), of video(s)) with a field of view may be captured by an image capture device during a capture duration. A field of view of visual content may define a field of view of a scene captured within the visual content. A capture duration may be measured/defined in terms of time durations and/or frame numbers. For example, visual content may be captured during a capture duration of 60 seconds, and/or from one point in time to another point in time. As another example, 1800 images may be captured during a capture duration. If the images are captured at 30 images/second, then the capture duration may correspond to 60 seconds. Other capture durations are contemplated.

The system 10 may be remote from the image capture device or local to the image capture device. One or more portions of the image capture device may be remote from or a part of the system 10. One or more portions of the system 10 may be remote from or a part of the image capture device. For example, one or more components of the system 10 may be carried by a housing, such as a housing of an image capture device. For instance, optical element(s), image sensor(s), and/or position sensor(s) of the system 10 may be carried by the housing of the image capture device. The housing may carry other components, such as the processor 11 and/or the electronic storage 13. References to a housing of an image capture device may refer to the image capture device, and vice versa. For example, references to position/motion of a housing of an image capture device may refer to position/motion of the image capture device, and vice versa.

Figure 3:
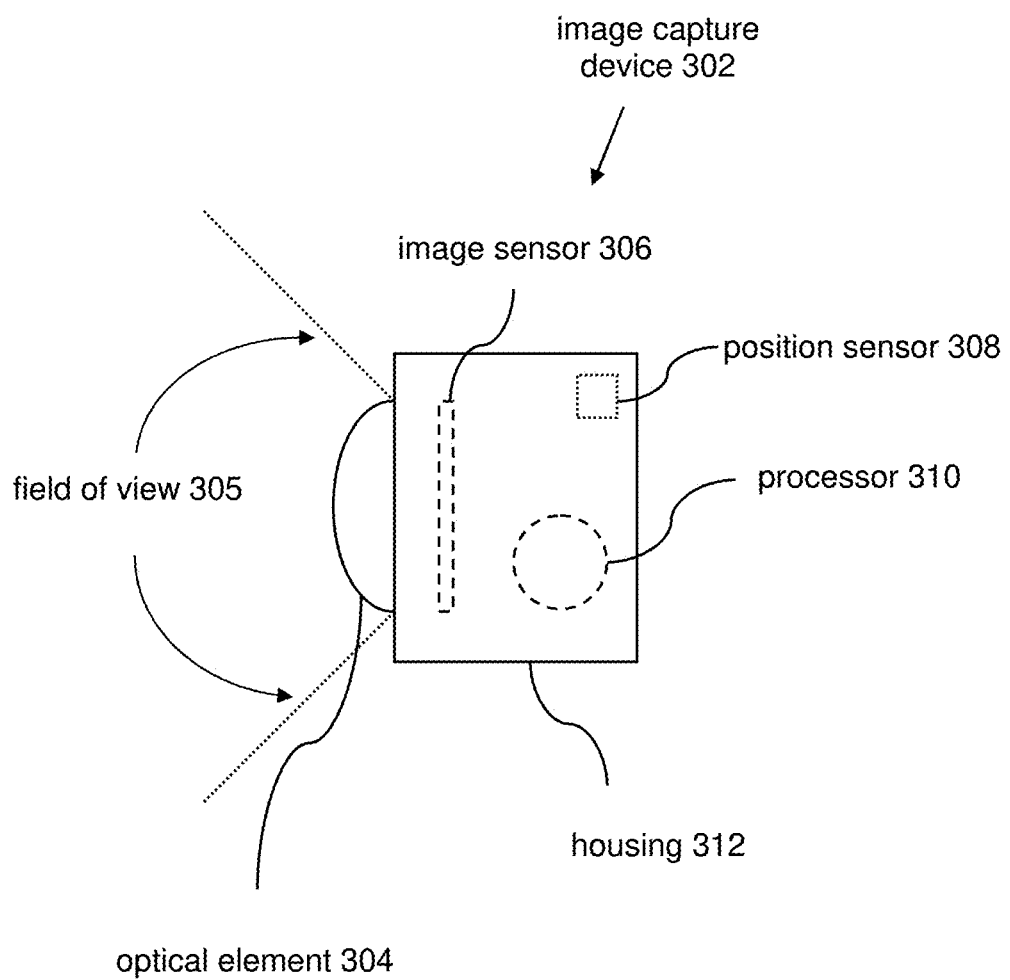
FIG. 3 illustrates an example image capture device.

An image capture device may refer to a device for recording visual information in the form of images, videos, and/or other media. An image capture device may be a standalone device (e.g., camera) or may be part of another device (e.g., part of a smartphone, tablet). FIG. 3 illustrates an example image capture device 302. The image capture device 302 may include a housing 312, and the housing 312 may carry (be attached to, support, hold, and/or otherwise carry) an optical element 304, an image sensor 306, a position sensor 308, a processor 310, and/or other components. Other configurations of image capture devices are contemplated.

The optical element 304 may include instrument(s), tool(s), and/or medium that acts upon light passing through the instrument(s)/tool(s)/medium. For example, the optical element 304 may include one or more of lens, mirror, prism, and/or other optical elements. The optical element 304 may affect direction, deviation, and/or path of the light passing through the optical element 304. The optical element 304 may have a field of view 305. The optical element 304 may be configured to guide light within the field of view 305 to the image sensor 306. The field of view 305 may include the field of view of a scene that is within the field of view of the optical element 304 and/or the field of view of the scene that is delivered to the image sensor 306. For example, the optical element 304 may guide light within its field of view to the image sensor 306 or may guide light within a portion of its field of view to the image sensor 306. The field of view 305 of the optical element 304 may refer to the extent of the observable world that is seen through the optical element 304. The field of view 305 of the optical element 304 may include one or more angles (e.g., vertical angle, horizontal angle, diagonal angle) at which light is received and passed on by the optical element 304 to the image sensor 306. In some implementations, the field of view 305 may be greater than or equal to 180-degrees. In some implementations, the field of view 305 may be smaller than or equal to 180-degrees.

The field of view 305 may be larger than a size of the punchout/viewing window used to generate time-lapse video frames. For example, a punchout/viewing window within the visual content may be used to stabilize visual content captured by the image capture device 302 and the stabilized visual content may be included within the time-lapse video frames. Stabilization of visual content may include reduction, removal, and/or smoothing of motion present in the visual content due to motion (e.g., mechanical displacement, rotational motion, translational motion) of the image capture device 302 during visual content capture. Motion of the image capture device 302 during visual content capture may result in motion within the captured visual content. For example, shaking of the image capture device 302 during visual content capture may result in shaky motion within the captured visual content. Such motion within the visual content may be unintentional and/or not be desirable. Such motion may become more pronounced in time-lapse videos due to increase in perceived playback speed of the time-lapse videos.

Portions of the visual content captured from light within the field of view 305 may be presented on a display and/or used to generate time-lapse video frames. The portions of the visual content presented on the display/used to generate time-lapse video frames may include those portions of the visual content within a viewing window. A viewing window may define extents of the visual content (e.g., of image(s)/video frame(s)) to be included within a punchout. The viewing window may be determined so that the visual content within the presentation/time-lapse video frames do not include, include less motion, or include smoother motion than the visual content. For instance, the visual content may include shaky/jerky footage due to motion of the image capture device 302 during visual content capture, and the viewing window may be determined so that the portion of the visual content that is presented/used for time-lapse video frame generation does not appear shaky/jerky or appears less shaky/jerky. For example, the shape, size, and/or the location of the viewing window within the visual content may be determined to compensate for motion of the image capture device 302 during capture such that the time-lapse video frames appear to have been captured from an image capture device 302 with less/smoother motion. That is, the visual content captured by the image capture device 302 may be cropped to generate time-lapse video frames that are stabilized.

The image sensor 306 may include sensor(s) that converts received light into output signals. The output signals may include electrical signals. For example, the image sensor 306 may include one or more of a charge-coupled device sensor, an active pixel sensor, a complementary metal-oxide semiconductor sensor, an N-type metal-oxide-semiconductor sensor, and/or other image sensors. The image sensor 306 may generate output signals conveying information that defines visual content of one or more images and/or one or more video frames of a video. For example, the image sensor 306 may be configured to generate a visual output signal based on light that becomes incident thereon during a capture duration. The visual output signal may convey visual information that defines visual content having the field of view.

The position sensor 308 may include sensor(s) that measures experienced positions and/or motions. The position sensor 308 may convert experienced positions and/or motions into output signals. The output signals may include electrical signals. For example, the position sensor 308 may refer to a set of position sensors, which may include one or more inertial measurement units, one or more accelerometers, one or more gyroscopes, and/or other position sensors. The position sensor 308 may generate output signals conveying information that characterizes positions and/or motions of the position sensor 308 and/or device(s) carrying the position sensor 308, such as the image capture device 302 and/or the housing 312.

For example, the position sensor 308 may be configured to generate a position output signal based on positions of the image capture device 302 during the capture duration. The position output signal may convey position information that characterizes positions of the image capture device 302 at different moments (points in time, time durations) within the capture duration. The position information may characterize positions of the image capture device 302 based on specific translational and/or rotational positions of the image capture device 302 and/or based on changes in translational and/or rotational positions of the image capture device 302 as a function of progress through the capture duration. That is, the position information may characterize translational and/or rotational positions of the image capture device 302 and/or changes in translational and/or rotational positions (motion) of the image capture device 302 (e.g., direction, amount, velocity, acceleration) during the capture duration. The position information may include rotational position information characterizing rotational position of the image capture device 302, translational position information characterizing translational position of the image capture device 302, and/or other position information.

The position information may be determined based on signals generated by the position sensor 308 and independent of the information/signals generated by the image sensor 306. That is, position information may be determined without using visual content/images/videos generated by the image sensor 306. Use of visual content/images/videos to determine positions/motions of the image capture device 302 may be computationally expensive in terms of processing power, processing time, and/or battery consumption. Using the information/signals from the position sensor 308 to determine positions/motions of image capture device 302 may be computationally cheaper. That is, less processing power, processing time, and/or battery consumption may be required when positions/motions of the image capture device 302 are determined from the information/signals from the position sensor 308 than the information/signals from the image sensor 306. The position information determined independent of the image information may be used to determine the positions of the image capture device 302 during the capture duration.

In some implementations, the position information may include data from the position sensor (e.g., gyroscope data, accelerometer data) with time stamps per visual content capture at different moments. For example, the position may include gyroscope data and/or accelerometer data per individual video frames captured by the image capture device. In some implementations, calibration of an inertial measurement unit may be used to combine different data within the position information.

The position information may be used to determine a trajectory of an image capture device during a capture duration. A trajectory of an image capture device may refer to one or more paths and/or progression followed by the image capture device during the capture duration. The trajectory may reflect positions of the image capture device at different moments within the capture duration. The positions of the image capture device may include rotational positions (e.g., rotations about one or more axis of the image capture device) and/or translational positions (e.g., displacement along one or more translational directions) of the image capture device.

Figure 4A:
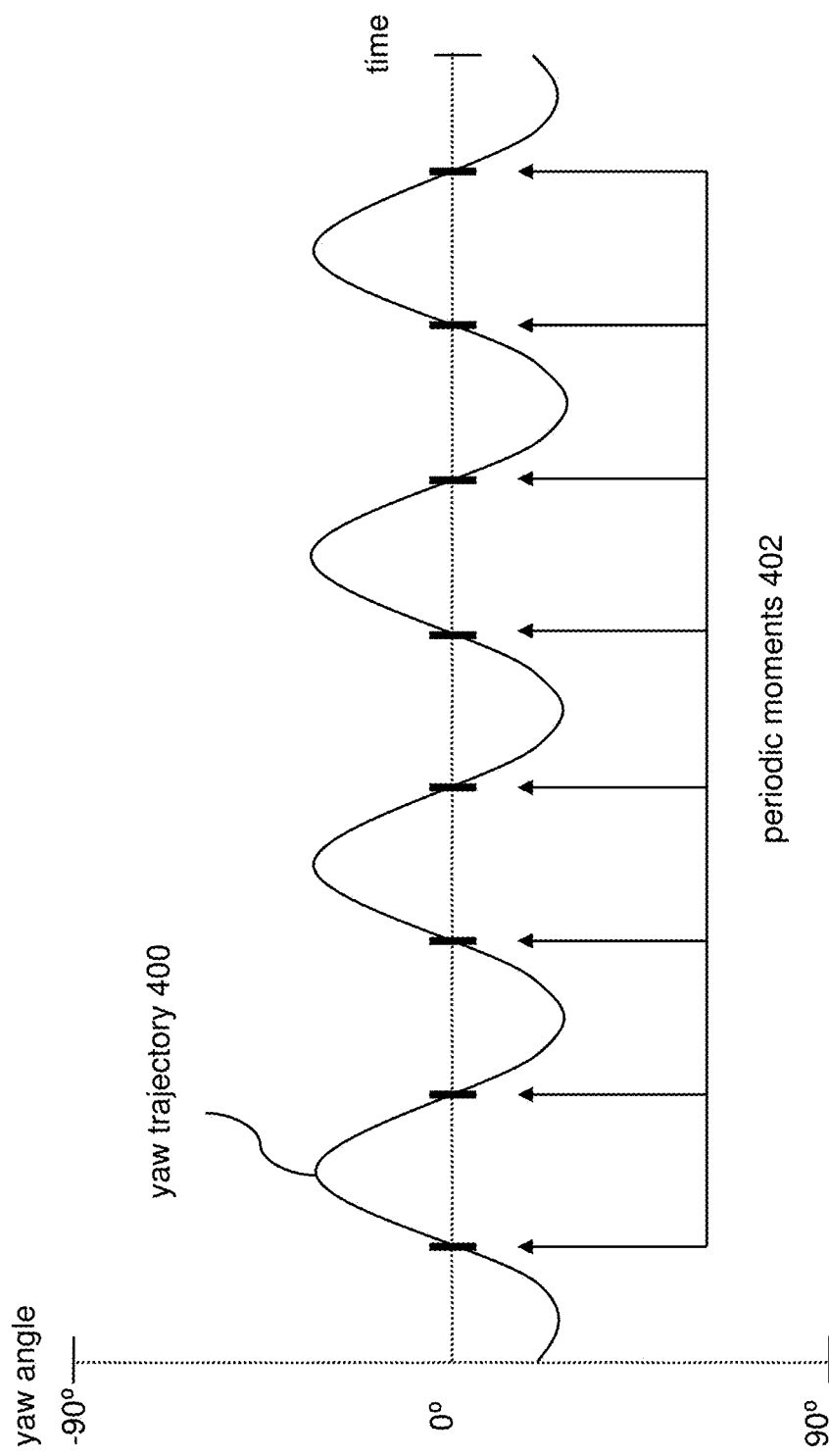

FIGS. 4A and 4B illustrate example trajectories of an image capture device. The trajectories of the image capture device shown in FIGS. 4A and 4B may include yaw trajectories 400, 450 of the image capture device. The yaw trajectories 400, 450 may reflect yaw angle positions (e.g., rotational positions defined with respect to a yaw axis, rotation to the left or right) of the image capture device at different times (e.g., different moments within the capture duration). Other types of trajectory of the image capture device (e.g., pitch trajectory, roll trajectory, translational trajectory) are contemplated.

The yaw trajectories 400, 450 may be caused by periodic motion of the image capture device. Periodic motion may refer to motion (e.g., rotation) that is repeated in intervals of time. Periodic motion may cause periodic changes in the rotational position of the image capture device. Periodic changes in the rotational position of the image capture device may cause periodic changes in the direction in which the field of view of the image capture device is directed (periodic change in where the image capture device is pointed). For example, the yaw trajectories 400, 450 may be caused by periodic rotation of the image capture device about its yaw axis (rotation of the image capture device between left and right). For instance, the yaw trajectories 400, 450 may be caused by rotation of an object holding the image capture device. For example, a person may be walking and/or running, and the image capture device may be held in the person's hand, mounted on the person (e.g., on the person's chest, on the person's head), and/or otherwise carried by the person. The walking and/or running of the person may case the image capture device to undergo periodic rotation. For example, the person's upper body may rotate between left and right, and the yaw trajectories 400, 450 may be caused by rotation of the person's upper body.

Periodic motion of the image capture device may result in periodic moments 402 along the time of the yaw trajectory 400. Periodic moments 402 may refer to moments in time at which the yaw position of the image capture device is the same (e.g., being repeated). For instance, the periodic moments 402 may correspond to moments in time when the image capture device was pointed in the forward direction (e.g., center of right and left rotation).

Periodic motion of the image capture device may repeat at different intervals. The rate of repetition of the period motion may depend on the repeating interval. For example, the yaw trajectory 450 may be caused by a periodic motion of the image capture device at longer intervals than the periodic motion that caused the yaw trajectory 400. For example, the yaw trajectory 450 may be caused by the person's upper body rotating at a slower rate (e.g., upper body turning more slowly during a slower walk/run) than for the yaw trajectory 400. Periodic motion of the image capture device may result in periodic moment 452 along the time of the yaw trajectory 450. The periodic moments 452 may be farther space apart than the periodic moment 402. Other periodic moments and other directions of image capture device are contemplated.

The processor 310 may include one or more processors (logic circuitry) that provide information processing capabilities in the image capture device 302. The processor 310 may provide one or more computing functions for the image capture device 302. The processor 310 may operate/send command signals to one or more components of the image capture device 302 to operate the image capture device 302. For example, the processor 310 may facilitate operation of the image capture device 302 in capturing image(s) and/or video(s), facilitate operation of the optical element 304 (e.g., change how light is guided by the optical element 304), and/or facilitate operation of the image sensor 306 (e.g., change how the received light is converted into information that defines images/videos and/or how the images/videos are post-processed after capture).

The processor 310 may obtain information from the image sensor 306 and/or the position sensor 308, and/or facilitate transfer of information from the image sensor 306 and/or the position sensor 308 to another device/component. The processor 310 may be remote from the processor 11 or local to the processor 11. One or more portions of the processor 310 may be part of the processor 11 and/or one or more portions of the processor 10 may be part of the processor 310. The processor 310 may include and/or perform one or more functionalities of the processor 11 shown in FIG. 1.

For example, the processor 310 may use the position information to determine a time-lapse video frame rate at which time-lapse video frames are generated. The position information may be used to identify the rate at which visual content captured by the image sensor 306 includes sufficient overlap so that a smooth time-lapse video may be generated. For instance, the position information may be used to identify periodic motion experienced by the image capture device 302 and identify the interval at which periodic moments occur. Generation of time-lapse video frames may include selection of images captured by the image capture device 302 in accordance with the time-lapse video frame rate for inclusion in a time-lapse video and/or capture of images by the image capture device 302 in accordance with the time-lapse video frame rate for inclusion in a time-lapse video. One or more pairs of adjacent time-lapse video frames (e.g., pair(s) of most recently selected/captured time-lapse video frames, pair(s) of time-lapse video frames selected/captured using current value of time-lapse video frame rate) may be analyzed by the processor 310 to determine apparent motion between the pair(s) of time-lapse video frames.

The apparent motion between the pair(s) of time-lapse video frames may be used to determine whether the value of the time-lapse video frame rate determined (e.g., set, increased, decreased) based on the position information is acceptable or not. For example, the apparent motion between the pair(s) of time-lapse video frames may include chaotic motion, indicating that the depiction of things (e.g., scene, objects, background) captured within the pair(s) of time-lapse video frames has changed too much between the time-lapse video frames to provide a smooth time-lapse video and that the value of the time-lapse video frame rate should be increased. Chaotic motion may indicate that the environment around the image capture device changed greatly during moments at which the pair(s) of time-lapse video frames are captured, and that the time-lapse video frames should be captured/selected with smaller time interval.

For instance, while the periodic motion of the image capture device 302 may indicate that the time-lapse video frame rate (number of time-lapse video frames generated per an interval of time) may be set to a certain value, the value set based on the periodic motion may be too low (the interval between time-lapse video frames are too long) and may result in the time-lapse video frames being generated too apart to provide a smooth time-lapse video. For example, the time-lapse video frames may be generated between too much changes in the environment of the image capture device 302, which may cause the time lapse video to appear erratic and/or chaotic.

The time-lapse video frame rate may be adjusted based on the apparent motion between the pair(s) of time-lapse video frames. The value of the time-lapse video frame rate may be increased (resulting in more frequent generation of time-lapse video frames) based on the apparent motion including large amount of motion (e.g., above a threshold level) and indicating that the time-lapse video frame rate is too low. The value of the time-lapse video frame rate may be decreased (resulting in less frequent generation of time-lapse video frames) based on the apparent motion including small amount of motion (e.g., lower than a threshold level same as or different than the threshold level used to detect large amount of motion) and the periodic motion of the image capture device 302 allowing for lower time-lapse video frame rate. Thus, the time-lapse video frame rate may be dynamically adjusted based on the position information of the image capture device and the apparent motion between pair(s) of generated time-lapse video frames to generate smooth time-lapse videos.

Referring back to FIG. 1, the processor 11 (or one or more components of the processor 11) may be configured to obtain information to facilitate stabilizing videos. Obtaining information may include one or more of accessing, acquiring, analyzing, determining, examining, identifying, loading, locating, opening, receiving, retrieving, reviewing, storing, and/or otherwise obtaining the information. The processor 11 may obtain information from one or more locations. For example, the processor 11 may obtain information from a storage location, such as the electronic storage 13, electronic storage of information and/or signals generated by one or more sensors, electronic storage of a device accessible via a network, and/or other locations. The processor 11 may obtain information from one or more hardware components (e.g., an image sensor, a position sensor) and/or one or more software components (e.g., software running on a computing device).

The visual information component 102 may be configured to obtain visual information and/or other information. Obtaining visual information may include one or more of accessing, acquiring, analyzing, determining, examining, identifying, loading, locating, opening, receiving, retrieving, reviewing, storing, and/or otherwise obtaining the visual information. The visual information component 102 may obtain visual information from one or more locations. For example, the visual information component 102 may obtain visual information from a storage location, such as the electronic storage 13, electronic storage of information and/or signals generated by one or more sensors, electronic storage of a device accessible via a network, and/or other locations. The visual information component 102 may obtain visual information from one or more hardware components (e.g., an image sensor) and/or one or more software components (e.g., software running on a computing device).

The visual information may define visual content of one or more images. The visual information may define visual content of image(s) by including information that defines one or more content, qualities, attributes, features, and/or other aspects of the visual content. For example, the visual information may define visual content of an image by including information that makes up the content of the image, and/or information that is used to determine the content of the image. For instance, the visual information may include information that makes up and/or is used to determine the arrangement of pixels, characteristics of pixels, values of pixels, and/or other aspects of pixels that define visual content of the image. For example, the visual information may include information that makes up and/or is used to determine pixels of the image. Other types of visual information are contemplated.

The visual content may be captured by an image capture device during a capture duration. The visual content of different images may be captured by the image capture device during different moments (e.g., points in time, durations of time) within the capture duration. The visual information component 102 may obtain visual information defining visual content while the visual content is being captured. The visual information component 102 may obtain visual information defining visual content after the visual content has been captured and stored in memory (e.g., the electronic storage 13).

In some implementations, the visual information component 102 may obtain visual information based on user interaction with a user interface/application (e.g., video editing application, video player application), and/or other information. For example, a user interface/application may provide option(s) for a user to select one or more images from which one or more time-lapse videos are to be generated and/or played. The visual information defining the visual content may be obtained based on the user's selection of the visual content/images through the user interface/video application. Other selections of visual content are contemplated.

The position information component 104 may be configured to obtain position information of the image capture device (that captured and/or is capturing visual content) and/or other information. Obtaining position information may include one or more of accessing, acquiring, analyzing, determining, examining, identifying, loading, locating, opening, receiving, retrieving, reviewing, storing, and/or otherwise obtaining the position information. The rotational position information component 104 may obtain rotational position information from one or more locations. For example, the rotational position information component 104 may obtain rotational position information from a storage location, such as the electronic storage 13, electronic storage of information and/or signals generated by one or more sensors, electronic storage of a device accessible via a network, and/or other locations. The rotational position information component 104 may obtain rotational position information from one or more hardware components (e.g., a motion sensor) and/or one or more rotational position components (e.g., software running on a computing device).

The position information component 104 may be configured to obtain position information of the image capture device during acquisition of the visual content and/or after acquisition of the visual content. For example, the position information component 104 may obtain position information of the image capture device while the visual content is being captured. The position information component 104 may obtain position information of the image capture device after the visual content has been captured and stored in memory (e.g., the electronic storage 13). For example, the position information may be captured and stored by one or more position sensors, and may be obtained by the position information component 104 when time-lapse video generation is desired.

The position information may characterize positions of the image capture device that capture visual content during the capture duration. Positions of the image capture device may include rotational positions, translational positions, and/or other positions. In some implementations, the position information may characterize the positions of the image capture device during the capture duration based on the position information including rotational position information, translational position information, and/or other position information. The rotational position information may characterize rotational positions of the image capture device during the capture duration. The translational position information may characterize translational positions of the image capture device during the capture duration. In some implementations, the position information may characterize the positions of the image capture device during the capture duration further based on the position information including acceleration information and/or other information. The acceleration information may characterize accelerations of the image capture device during the capture duration.

Position of an image capture device may refer to how the image capture device is oriented. For example, rotational positions of an image capture device may refer to how the image capture device is oriented/rotated around one or more axis or one or more point, such as a center point. For instance, rotational positions of an image capture device may refer to how the image capture device is rotated about one or more of yaw axis (e.g., such as shown by the yaw trajectories 400, 450 in FIGS. 4A and 4B), pitch axis, and/or roll axis while capturing video content. Rotational position information of an image capture device may characterize how the image capture device is rotated (e.g., amount of rotations about the yaw, pitch, and/or roll axis) and/or is being rotated (e.g., speed and/or direction of rotations) at different moments within a capture duration. Translational positions of an image capture device may refer to locations of the image capture device with respect to one or more fixed points. For instance, translational positions of an image capture device may refer to how the image capture device is moving along one or more translational direction (e.g., moving forward, backward, laterally) while capturing video content. Translational position information of an image capture device may characterize how the image capture device is displaced (GPS location) and/or is being displaced (e.g., speed and/or direction of translational displacement) at different moments within a capture duration.

The frame rate component 106 may be configured to determine a time-lapse video frame rate based on the position information and/or other information. The time-lapse video frame rate may define a rate at which time-lapse video frames are generated based on the visual content. The value of the time-lapse video frame rate may change based on different positions of the image capture device during the capture duration, the apparent motion between pair(s) of time-lapse video frames, and/or other information. The dynamic value of the time-lapse video frames may enable generation of a smooth time-lapse video frames that includes different perceived playback speeds based on visual content capture conditions (e.g., image capture device positions, environment around the image capture device). That is, rather than having a time-lapse video with a single perceived playback speed (e.g., 10×), use of the dynamic time-lapse video frame rate may enable generation of a time-lapse video with perceived playback speeds that changes based on visual content capture conditions.

Determining the time-lapse video frame rate based on the position information may include setting the time-lapse video frame rate to a particular value, increasing the value of the time-lapse video frame rate, decreasing the value of the time-lapse video frame rate, and/or maintaining the value of the time-lapse video frame rate based on the position information. For example, the position information/position of the image capture device may be factored into one or more score functions that determines the value of the time-lapse video frame rate. The score function(s) may reduce/minimize changes in value of the time-lapse video frame rate. The score function(s) may place limits (e.g., upper and/or lower limits) on the amounts by which the value of the time-lapse video frame rate may change.

The time-lapse video frames may include different time-lapse video frames generated based on the visual content captured by the image capture device at different moments within the capture duration. For example, the time-lapse video frames may include a first time-lapse video frame generated based on the visual content captured by the image capture device at a first moment within the capture duration, a second time-lapse video frame captured by the image capture device at a second moment subsequent to the first moment within the capture duration, and/or other time-lapse video frames captured by the image capture device at other moments within the capture duration.

The position information may be used to determine the time-lapse video frame rate that will generate time-lapse video frames with overlapping visual content. The overlapping visual content between adjacent time-lapse video frames may enable generation of a smooth/smoother time-lapse video. Using a static time-lapse video frame rate may result in shaky and/or jerky time-lapse video. For instance, if a perceived playback speed-up of 10× is desired for a video, then every 10th video frame of the video may be selected as time-lapse video frames for inclusion in the time-lapse video. However, such generation of time-lapse video may result in shaky and/or jerky video. For example, if the video was captured with the image capture device being pointed at different directions (to the front, to the right, and then to the front), the time-lapse video frames that are selected simply based on number of video frames may result in a time-lapse video that includes a time-lapse video frame including visual capture of the front of the image capture device to be next to a time-lapse video frame including visual capture of the left of the image capture device. The lack of overlapping visual content between the adjacent time-lapse video frames may make the time-lapse video to appear shaky and/or jerky.

The position information may be used to determine the value of the time-lapse video frame rate at which visual content captured by the image capture device includes sufficient overlap so that a smooth time-lapse video may be generated. For instance, the positions (e.g., rotational positions) of the image capture device when capturing visual content may indicate to what extent visual content captured at different moments include depictions of the same part of the scene. The position information may be used to determine at what intervals the time-lapse video frames should be generated so that the visual content of adjacent time-lapse video frames include sufficient overlap and presentation of one time-lapse video frame followed by the next adjacent time-lapse video frame does not make the presentation of the time-lapse video frame to appear shaky and/or jerky.

For example, the position information may be used to identify periodic motion experienced by the image capture device and/or identify the interval at which periodic moments occur. For instance, based on the position information, the periodic motion experienced by the image capture device may be identified as the motion defined by the yaw trajectory 400 shown in FIG. 4A. Based on the position information, the periodic moments 402 shown in FIG. 4A and/or the intervals between the periodic moments 402 may be identified.

Figure 5A:
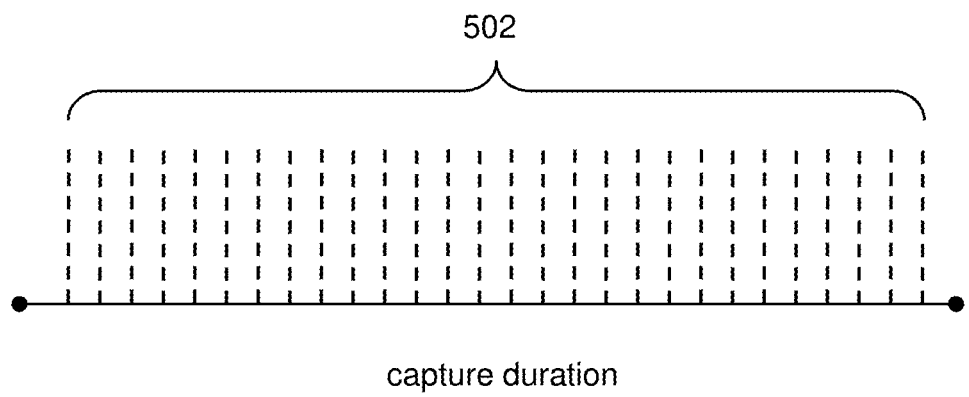
FIGS. 5A and 5B illustrate example periodic moments within capture durations.
Figure 5B:
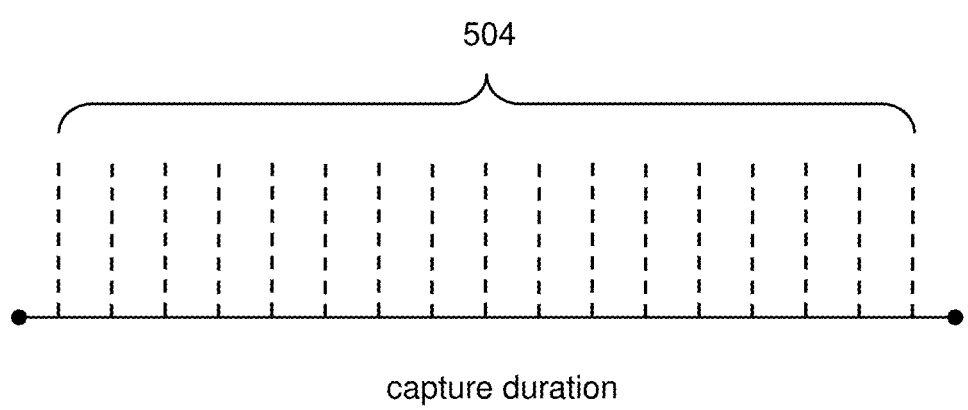

The position information may be used to identify the minimum speed-up of the perceived playback speed of the time-lapse video. The minimum speed-up of the perceived playback speed may correspond to a value of the time-lapse video frame rate that generates a time-lapse video frame at individual periodic moments. For example, FIGS. 5A and 5B illustrate example periodic moments 502, 504 within capture durations. The periodic moments 502 may correspond to the yaw trajectory 400 shown in FIG. 4A. The periodic moment 504 may correspond to the yaw trajectory 450 shown in FIG. 4B. The periodic moments 504 may be more spaced apart in time than the periodic moments 502 due to the periodic motion of the yaw trajectory 450 having a longer periodic interval than the periodic motion of the yaw trajectory 400.

Figure 6A:
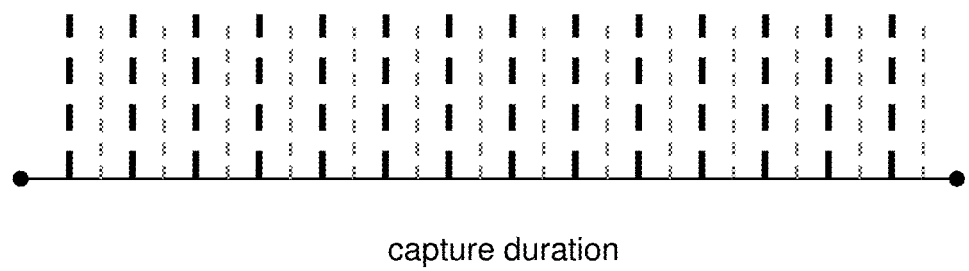
FIGS. 6A and 6B illustrate example generation of time-lapse video frames based on different time-lapse video frame rates.
Figure 6B:
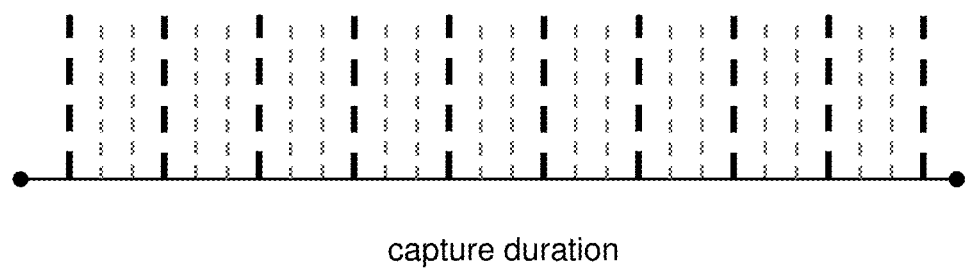

The value of the time-lapse video frame rate may be determined so that a time-lapse video frame is generated at every periodic moment or at some multiples of periodic moments (e.g., one time-lapse video frame for every two-periodic moments, for every three-periodic moments). Using multiples of periodic moments may result in faster perceived playback speed of the time-lapse video. For example, FIGS. 6A and 6B illustrate example generations of time-lapse video frames based on different time-lapse video frame rates. In FIG. 6A, a time-lapse video frame may be generated at every two periodic moments. In FIG. 6B, a time-lapse video frame may be generated at every three periodic moments. The time-lapse video frame rate used to generate the time-lapse video frames shown in FIG. 6A may be higher than the time-lapse video frame rate used to generate the time-lapse video frames shown in FIG. 6B. Use of other multiples of periodic moments to determine time-lapse video frame rates are contemplated.

Determination of the time-lapse video frame rate based on the periodic moments may enable setting of the time-lapse video frame rate based on actual positions of the image capture device and/or based on prior positions of the image capture device. For example, an image capture device may have captured images during the capture duration, and the positions of the image capture device during the capture duration may be used to identify periodic moments within the capture duration, which may then be used to select which of the captured images shown be included within a time-lapse video as time-lapse video frames.

As another example, periodic moments may be identified based on prior rotational positions of the image capture device resulting from a periodic motion. The future rotational positions of the image capture device may be assumed to continue the periodic motion so that the periodic moments in the future will continue the intervals observed in the historical periodic moments. For example, the position information may be used to determine the periodicity of motion of a person walking and/or running, with the image capture device held in the person's hand, mounted on the person (e.g., on the person's chest, on the person's head), and/or otherwise carried by the person. The periodicity of the motion in the past (e.g., how the person walked/ran in the past) may be used to predict the periodicity of the motion in the future (e.g., how the person will walk/run in the future), and the time-lapse video frame rate may be determined so that time-lapse video frames are generated (e.g., captured) at individual/multiples of predicted periodic moments. Thus, time-lapse video frame rate may enable generation of time-lapse video frames based on the periodic rhythm of the motion experienced by the image capture device.

In some implementations, determination of the time-lapse video frame rate based on the position information may include: (1) determination of an amount of field of view overlap between the visual content captured at different moments within the capture duration based on the position information and/or other information; and (2) determination of the time-lapse video frame rate based on the amount of field of view overlap between the visual content captured at different moments within the capture duration and/or other information. For example, based on the rotational position of the image capture device, the amount of overlap between the fields of view observed by/seen through the image capture device at different moments may be determined.

Figure 7A:
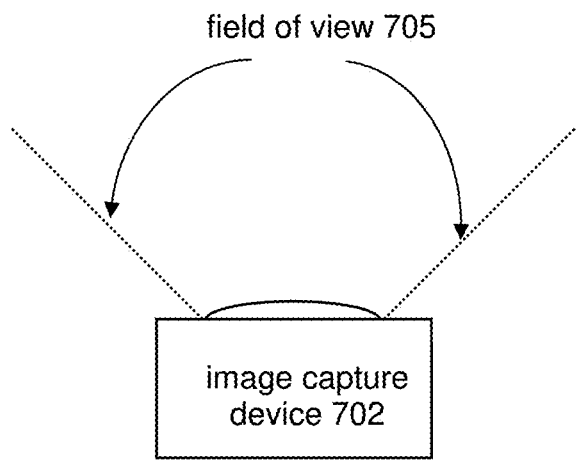
FIGS. 7A and 7B illustrate example rotations of a field of view of an image capture device.
Figure 7B:
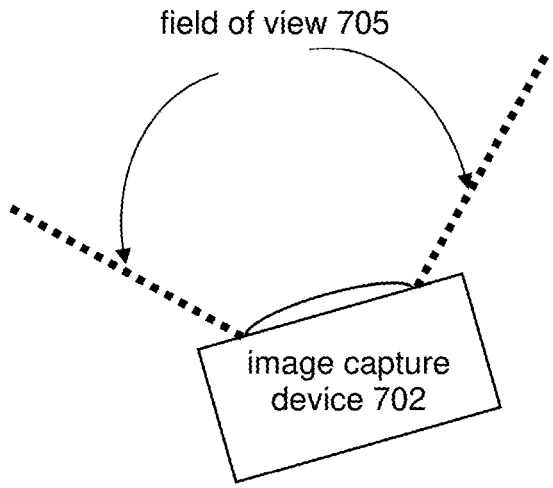

FIGS. 7A and 7B illustrate example rotations of a field of view 705 of an image capture device 702. In FIG. 7A, at one moment within the capture direction, the image capture device 702 may be oriented to face a particular direction (e.g., forward direction), and the field of view 705 of the image capture device 702 may include an extent of the scene in front of the image capture device 702. In FIG. 7B, at another (subsequent) moment in the capture duration, the image capture device 702 may be oriented towards the left (e.g., rotated to the left compared to the rotational position shown in FIG. 7A). The field of view 705 of the image capture device 702 may include an extent of the scene in front-left of the image capture device 702 in FIG. 7B. The time-lapse video frame rate for the visual content captured by the image capture device 702 may be determined based on the amount of field of view overlap between the visual content captured at the different moments.

Figure 7C:
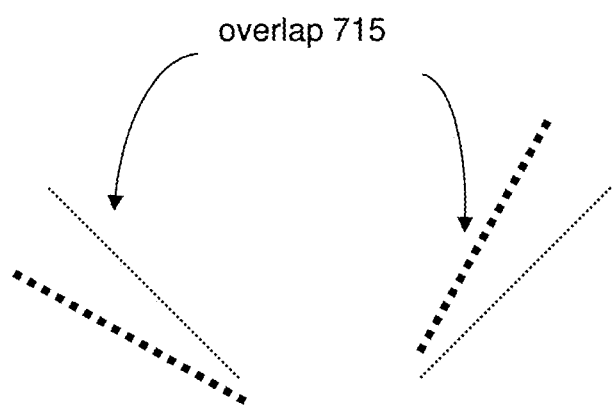
FIG. 7C illustrates an example overlap in fields of view shown in FIGS. 7A and 7B.

FIG. 7C illustrates an example overlap 705 in fields of view shown in FIGS. 7A and 7B. Based on the overlap 715 being sufficiently large (e.g., larger than a threshold angle), the time-lapse video frame rate may be determined so that the intervals at which time-lapse video frames are generated include the interval between the moments corresponding to FIGS. 7A and 7B. Based on the overlap 715 not being sufficiently large, the time-lapse video frame rate may be determined to be a different value (e.g., smaller, larger). The time-lapse video frame rate may be determined by finding intervals at which the amount of field of view overlap between the visual content captured at the different moments are of sufficient size.

In some implementations, determination of the time-lapse video frame rate based on the position information may include: (1) identification of one or more motion types of the image capture device based on the position information and/or other information; and (2) determination of the time-lapse video frame rate based on the motion type(s) of the image capture device and/or other information. Motion type may refer to type and/or category of motion experienced by the image capture device. Motion type may depend on motion of the image capture device and/or the motion of the thing holding the image capture device. For example, motion types may include one or more of panorama motion type, static motion type, ego-motion type, and/or other motion types.

Panorama motion type may include motion of the image capture device to capture a panoramic view of a scene. Panoramic motion type may include continuous rotation of the image capture device in a particular angular direction. Static motion type may include the image capture device being relatively still. Static motion type may include movement of the image capture device due to shakiness of the thing holding the image capture device (e.g., shakiness of hand/body holding the image capture device in a position). Ego-motion type may include movement of the image capture device not related to panning. Ego-motion type may include translational movement of the image capture device (e.g., during walking, running, biking) and/or non-linear movement of the image capture device.

In some implementations, motion type of the image capture device may be determined based on linear regression, estimated slope, and/or quadratic residual of the position information. In some implementations, acceleration and rotational position data for the image capture device may be used to distinguish different types of motion. For example, combination of acceleration and rotational position data for the image capture device may be used to distinguish between static motion type and panning motion type. In some implementations, visual analysis of the visual content may be performed to determine the motion type of the image capture device. In some implementations, visual analysis of the visual content may be used with the position information to determine the motion type of the image capture device.

The time-lapse video frame rate may be determined based on the motion type(s) of the image capture device and/or other information. For instance, the value of the time-lapse video frame rate may be set, increased, and/or decreased differently based on the motion type(s) of the image capture device. For example, the time-lapse vide frame rate may be decreased (e.g., increase intervals between time-lapse video frames) and/or set to a particular value based on the motion type(s) including static motion type (indicating that a user has stopped (e.g., at a stop light). The time-lapse vide frame rate may be increased (e.g., decrease intervals between time-lapse video frames) and/or set to a particular value (e.g., less than the value for static motion) based on the motion type(s) including static motion type and panning motion type (indicating that a user has stopped to observe a panoramic view of a scene). The time-lapse video frame rate may be determined as a dynamic value based on the motion type(s) including ego-motion type. Other determinations of the time-lapse video frame rate based on the motion type(s) of the image capture device are contemplated.

In some implementations, the time-lapse video frame rate may be initially determined based on an environment in which the visual content is initially captured by the image capture device and/or other information. The environment may refer to the surroundings, conditions, and/or physical area in which the visual content is initially captured by the image capture device.

Different values of time-lapse video frame rate may be appropriate for different environments of visual content capture. For example, a perceived-playback speed of 8× in time-lapse video may be too fast for indoor visual content and may be too slow for outdoor visual content capture. For instance, same amount of translational movement indoor and outdoor may result in different changes in the observed surrounding of the image capture device.

For example, forward movement of ten feet indoor may result in large change in the observed surrounding of the image capture device while forward movement of ten feet outdoor may result in small change in the observed surrounding of the image capture device. Different changes in the observed surrounding of the image capture device in different environment may be due to different proximity of the environment to the image capture device, with things close to the image capture device resulting in greater changes in observed surrounding of the image capture device and things farther away from the image capture device resulting in smaller changes in the observed surrounding of the image capture device for same amount of image capture device movement. Thus, the environment in which the visual content is initially captured may be used to determine the initial value of the time-lapse video frame rate (e.g., faster value for indoor, smaller value for outdoor). For example, the time-lapse video frame rate may be set for indoor capture to generate a time-lapse video with a perceived-playback speed of 5× and may be set for outdoor capture to generate a time-lapse video with a perceived-playback speed of 10×.

In some implementations, the environment in which the visual content is initially captured by the image capture device may be determined based on one or more of an exposure, a white balance, and/or a scene classification of the visual content initially captured by the image capture device. Such determination of the environment may be used to determine the time-lapse video frame rate in place of environment depth measurement. That is, rather than determining how far/close things are located in relation to the image capture device in the environment, the exposure, the white balance, and/or the scene classification may be used as a substitute in determining how far things are likely located in relation to the image capture device.

The apparent motion information component 108 may be configured to obtain apparent motion information and/or other information. Obtaining apparent motion information may include one or more of accessing, acquiring, analyzing, determining, examining, identifying, loading, locating, opening, receiving, retrieving, reviewing, storing, and/or otherwise obtaining the apparent motion information. The apparent motion information component 108 may obtain apparent motion information from one or more locations. For example, the apparent motion information component 108 may obtain apparent motion information from a storage location, such as the electronic storage 13, electronic storage of information and/or signals generated by one or more sensors, electronic storage of a device accessible via a network, and/or other locations. The apparent motion information component 108 may obtain apparent motion information from one or more hardware components (e.g., an image sensor) and/or one or more software components (e.g., software running on a computing device). For instance, the apparent motion information component 108 may analyze the visual content of a pair of images to obtain the apparent motion information for the pair of images, and/or the apparent motion information component 108 may obtain apparent motion information for a pair of images determined by another component/computing device.

The apparent motion information may characterize apparent motion between pairs of two or more of the time-lapse video frames. For example, the time-lapse video frames may include a first time lapse video frame, a second time-lapse video frame, and/or other time-lapse video frames, and the apparent motion information may characterize apparent motion between the first time-lapse video frame and the second time-lapse video frame, and/or other apparent motion between other time-lapse video frames. The apparent motion information may characterize apparent motion between a pair of adjacent time-lapse video frames (two time-lapse videos frames next to each other in arrangement of video frames) and/or between a pair of other time-lapse video frames.

Apparent motion between a pair of images may refer to appearance of motion caused by viewing of the pair of images in succession. Apparent motion between a pair of images may be caused by differences in where depictions of things are located within the pair of images. In some implementations, the apparent motion information may be determined based on optical flow between the pairs of the two or more of the time-lapse video frames and/or other information. The apparent motion information for a pair of time-lapse video frames may include one or more values that indicate the length, direction, and/or type of optical flow between the pair of time-lapse video frames.

Figure 8A:
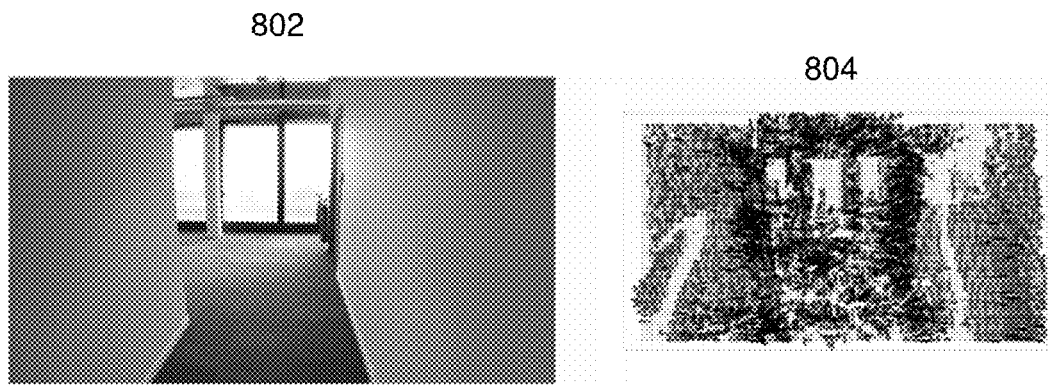
FIGS. 8A, 8B, and 8C illustrate example images and optical flow of the images.
Figure 8B:
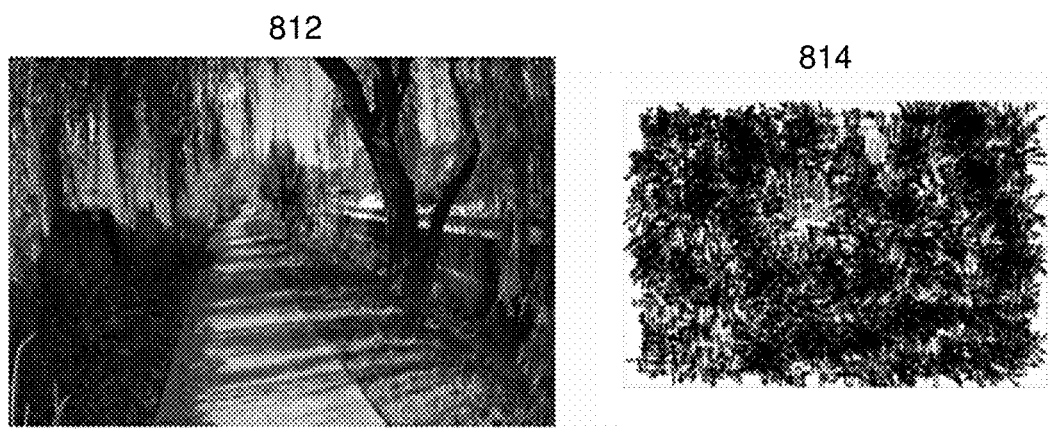
Figure 8C:
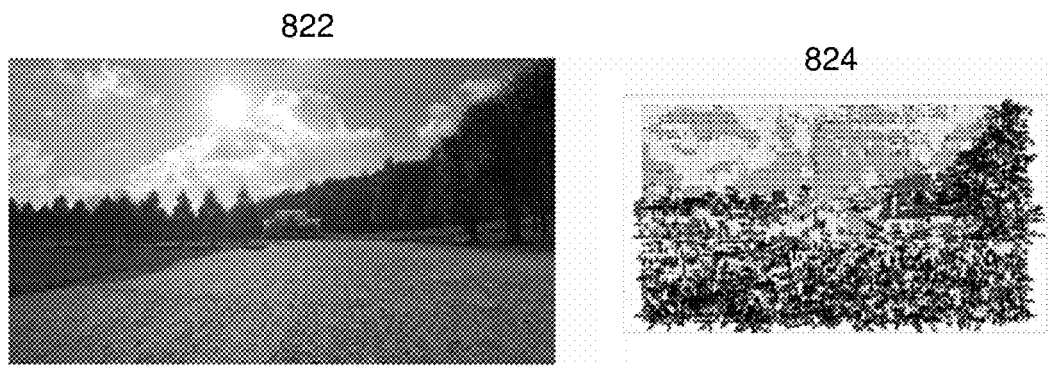

FIGS. 8A, 8B, and 8C illustrate example images and optical flow of the images. FIG. 8A shows an image 802 and optical flow 804 computed for the image 802. The optical flow 804 may be computed based on the image 802 and one or more other images (e.g., previously captured image, prior image). As shown in FIG. 8A, the optical flow 804 may be locally constant because of the flat areas within the scene depicted within the image 802. Such depictions may be pleasant to view at a fast rate (at high perceived playback speed).

FIG. 8B shows an image 812 and optical flow 814 computed for the image 812. The optical flow 814 may be computed based on the image 812 and one or more other images (e.g., previously captured image, prior image). As shown in FIG. 8B, the orientations of the optical flow 814 may be non-continuous and disordered because of the texture within the scene depicted within the image 812. Such depictions may be unpleasant to view at a fast rate.

FIG. 8C shows an image 822 and optical flow 824 computed for the image 822. The optical flow 824 may be computed based on the image 822 and one or more other images (e.g., previously captured image, prior image). As shown in FIG. 8C, the upper portion of the optical flow 824 may be locally constant because of the flat areas within the scene depicted within the upper portion of the image 822. The orientations of the optical flow 824 in the lower portion may be non-continuous and disordered because of the texture within the scene depicted within the lower portion of the image 822.

In some implementation, local orientation entropy may be used to distinguish between textured portions of a scene from flat portion of the scene. The local orientation entropy may be determined by diving the vector field into blocks (e.g., 6×6 block) and computing the orientations of the vectors. The values may be quantized into a histogram (e.g., 24 bins histogram), which may be used to compute the entropy for individual blocks. These values may be averaged on the whole image to determine a single value per image. In some implementations, the norm of the motion vectors may be used as an indicator to quantify the speed of apparent motion in the scene depicted within the image. In some implementations, the local variance of the motion vectors may be used as an indicator of both apparent speed and disorder.

In some implementations, large change in depictions of scene between pairs of images may result in motion vectors becoming saturated. The search rea may be too small for block matching algorithm to find good matches between two images. In such cases, distortion of motion vectors (e.g., in x, y) may exhibit large number of saturated values even then their corresponding areas in the images are flat. The proportion of saturated values may be used as indicator that the interval between the generation of images is too large and may result in unpleasant view.

The apparent motion between a pair of time-lapse video frames may be used to determine whether the value of the time-lapse video frame rate determined (e.g., set, increased, decreased) based on the position information is acceptable or not. For example, the position information of the image capture device may be used to determine a particular value for the time-lapse video frame rate. Two or more time-lapse video frames may be generated based on the particular value for the time-lapse video frame rate. The apparent motion between one or more pairs of these time-lapse video frame rate may be used to determine whether the particular value for the time-lapse video frame rate is acceptable or not to generate a smooth time-lapse video.

For example, the length, the direction, and/or the type of optical flow between a pair of time-lapse video frames may indicate whether the depiction of things (e.g., scene, objects, background) captured within the pair of time-lapse video frames has changed too much between the time-lapse video frames to provide a smooth time-lapse video and that the value of the time-lapse video frame rate should be increased. That is, while the position of the image capture device may indicate that a particular speed-up of the perceived playback speed may be achieved within the time-lapse video, the length, the direction, and/or type of optical flow between time-lapse video frames captured to provide the particular speed-up of the perceived playback speed may indicate that the surrounding of the image capture device has changed too much between capture of the time-lapse video frames, that the video frames do not include sufficient overlap to provide a smooth view of the captured content, and that the interval between generation of time-lapse video frames is too long.

As another example, the length, the direction, and/or the type of optical flow between a pair of time-lapse video frames may indicate whether the depiction of things (e.g., scene, objects, background) captured within the pair of time-lapse video frames has not changed by much between the time-lapse video frames and that the value of the time-lapse video frame may be decreased while still providing a smooth time-lapse video. For example, the time-lapse video frame rate may be set to a particular value, and the length, the direction and/or type of optical flow between time-lapse video frames captured using the particular value may indicate that the surrounding of the image capture device has experience little changed between capture of the time-lapse video frames, that the video frames include sufficient overlap to provide a smooth view of the captured content, and that more variation in the visual content of the video frames (by increasing the interval between generation of time-lapse video frames) may be tolerated to generate a smooth time-lapse video.

For example, ordering of the optical flow may be used to determine whether the current value of the time-lapse video frame rate is acceptable to generate a smooth time-lapse video. Ordering of the optical flow may refer to local consistency of the optical flow. For example, if a scene captured within visual content of a time-lapse video frame has textured and/or cluttered background, the motion vector field is likely to be locally disordered. Details and/or texture of the scene may cause block-matching algorithm to output randomly oriented vectors. Such ordering of optical flow may indicate that the perceived playback speed of the time-lapse video frame should be decreased (by increasing the time-lapse video frame rate). As another example, the length and the direction of the optical flow may indicate that the motion vector field is locally ordered and includes small values. Such length and direction of optical flow may indicate that the perceived playback speed of the time-lapse video frame may be increased (by decreasing the time-lapse video frame rate). Other uses of the optical flow (e.g., the length, the direction and/or type) to determine acceptability of current value of the time-lapse video frame rate are contemplated.

The adjustment component 110 may be configured to adjust the time-lapse video frame rate based on the apparent motion information and/or other information. Adjustment of the time-lapse video frame rate may include change in the value of the time-lapse video frame rate. Change in the value of the time-video frame rate may include increase in the value (resulting in more frequent generation of time-lapse video frames) and/or decrease in the value (resulting in less frequent generation of time-lapse video frames). For example, based on the apparent motion between a pair of time-lapse video frames exceeding a threshold (e.g., indicating large amount of motion), the time-lapse video frame rate (e.g., determined based on the position information) may be increased. Based on the apparent motion between a pair of time-lapse video frames being below a threshold (e.g., indicating large amount of motion), the time-lapse video frame rate (e.g., determined based on the position information) may be decreased. The amount by which the time-lapse video frame rate is adjusted may be limited by the positions at which the visual content is captured by the image capture device. For instance, the rotational positions of the image capture device during the capture duration may place limits on values of the time-lapse video frame rate that may be used to generate smooth time-lapse videos.

In some implementations, the determination of the time-lapse video frame rate based on the position information/position of the image capture device and the adjustment of the time-lapse video frame rate based on the apparent motion information/apparent motion may be performed via computation of one or more score functions. For instance, the position information/position of the image capture device (e.g., periodicity of image capture device motion) and the apparent motion information/apparent motion may be factored into one or more score functions that determines the value of the time-lapse video frame rate. The score function(s) may minimize/reduce changes in the value of the time-lapse video frame rate so that the perceived playback speed of the time-lapse video changes gradually as a function of progress through the progress length of the time-lapse video. The score function(s) may place limits (e.g., upper and/or lower limits) on the amounts by which the value of the time-lapse video frame rate may change so that the perceived playback speed of the time-lapse video does not change too quickly (e.g., prevent jump from 5× to 30× perceived playback speed).

In some implementations, the time-lapse video frame rate may be determined based on minimization of a scoring function. The scoring function may enable change in the time-lapse video frame rate based on one or more costs. For example, adding/increasing a cost of generating time-lapse video frames that are temporally closer to each other may be used to decrease the time-lapse video frame rate. As another example, making a cost of increasing time interval between time-lapse video frames (when recommended by the apparent motion between pairs of time-lapse video frames) less than the cost of maintaining the time interval between time-lapse video frames may be used to decrease the time-lapse video frame rate.

In some implementations, the time-lapse video frame rate may be adjusted linearly and/or non-linearly. For example, the rate at which the time-lapse video frame rate may stay the same or may be different through the change. The change in the time-lapse video frame rate may be symmetrical or non-symmetrical. For example, the time-lapse video frame rate may be increased and decreased at the same rate or at different rates (e.g., decrease in time-lapse video frame rate happens more quickly than increase in time-lapse video frame rate).

Figure 9:
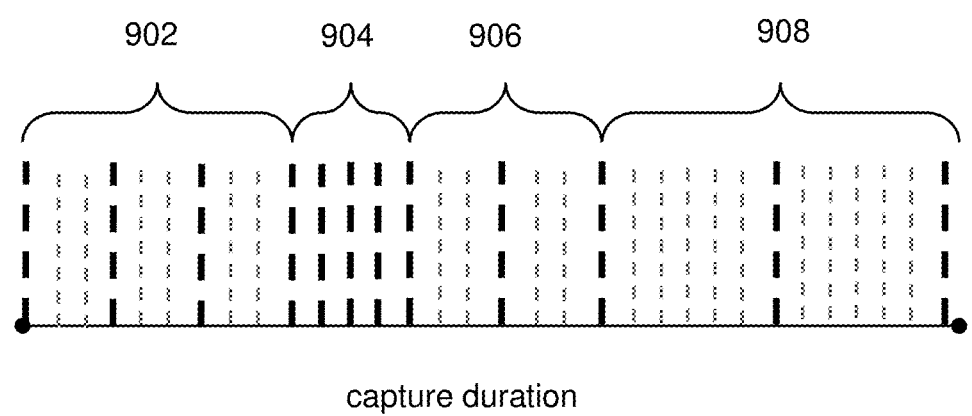
FIG. 9 illustrates example generation of time-lapse video frames based on a dynamic time-lapse video frame rate.

FIG. 9 illustrates example generation of time-lapse video frames based on a dynamic time-lapse video frame rate. FIG. 9 may show thirty-two moments within a capture duration. A time-lapse video may be generated by generating setting the time-lapse video frame rate to generate a time-lapse video frame at individual moments. However, such a time-lapse video may not use different perceived playback speeds based on visual content capture conditions (e.g., image capture device positions, environment around the image capture device as indicated by apparent motion between time-lapse video frames). A dynamic time-lapse video frame rate may be used to generate a time-lapse video with different perceived playback speeds based on visual content capture conditions. For example, as shown in FIG. 9, twelve time-lapse video frames may be generated based on a dynamic time-lapse video frame rate.

For a portion 902 of the capture duration, the value of the time-lapse video frame rate may be set so that a time-lapse video frame is generated for every three moment. For instance, individual moments in the portion may correspond to a periodic moment, and the value of the time-lapse video frame rate may be set based on the rotational positions of the image capture device during and/or prior to the portion 902.

For a portion 904 of the capture duration, the value of the time-lapse video frame rate may be set so that a time-lapse video frame is generated for every moment. For instance, the periodic motion of the image capture device may remain the same, and the apparent motion between pair(s) of the time-lapse video frames generated for the portion 902 may indicate that the time-lapse video frame rate is too small and that the time-lapse video frame rate should be increased to provide a smooth time-lapse video.

For a portion 906 of the capture duration, the value of the time-lapse video frame rate may be set so that a time-lapse video frame is generated for every three moment. For instance, the periodic motion of the image capture device may remain the same, and the apparent motion between pair(s) of the time-lapse video frames generated for the portion 902 may indicate that the time-lapse video frame rate is sufficient large and that the time-lapse video frame rate may be decreased while still providing a smooth time-lapse video. The time-lapse video frame rate may return to the value used for the portion 902.

For a portion 908, the value of the time-lapse video frame rate may be set so that a time-lapse video frame is generated for every six moments. For instance, the periodic motion of the image capture device may have changed so that periodic moment occurs every three moments, and the time-lapse video frame may be changed based on the change in the length of the intervals between periodic moments. Other time-lapse video frame rate determinations are contemplated.

In some implementations, local motion vectors (e.g., issued from a 3DNR block) may be used to determine whether the time-lapse video frame rate is acceptable or too slow. The local motion vector may be computed on the time-lapse video to measure the motion that will appear in the time-lapse video. In some implementations, three statistical values (proportion of saturation, mean local variance, mean local entropy) may be extracted from the local motion vector and grouped into one or more scores.

The generation component 112 may be configured to generate the time-lapse video frames based on the time-lapse video frame rate and/or other information. The generation component 112 may generate time-lapse video frames based on visual content captured by the image capture device at moments in accordance with the time-lapse video frame rate. The time-lapse video frame rate may be used to determine, based on moment of capture, which visual content will be included in the time-lapse video as time-lapse video frames.

In some implementations, generation of the time-lapse video frames based on the time-lapse video frame rate may include selection of the time-lapse video frames from images captured by the image capture device based on the time-lapse video frame rate and/or other information. For example, the image capture device may capture images at a certain rate, and the time-lapse video frame rate may be used to select some or all of the captured images for inclusion as time-lapse video frames in a time-lapse video. For example, referring to FIG. 9, thirty-two images may have been captured by an image capture device during a capture duration. Based on the time-lapse video frame rate (with values that change over the capture duration), twelve of the images may be selected for inclusion as time-lapse video frames in a time-lapse video.

In some implementations, generation of the time-lapse video frames based on the time-lapse video frame rate may include capture of the time-lapse video frames by the image capture device based on the time-lapse video frame rate and/or other information. That is, the rate at which the image capture device captures images may be set based on (e.g., same as, multiple of) the time-lapse video frame rate. For example, referring to FIG. 9, the image capture device may capture thirty-two images during a capture duration based on a fixed capture rate. By changing the capture rate on-the-fly to be the same as the dynamic time-lapse video frame rate, the image capture device may only capture twelve images. Setting of the capture rate of the image capture device based on the time-lapse video frame rate may enable the image capture device to minimize/reduce the number of images that are captured to generate a time-lapse video. Such capture of images may enable the image capture device to conserve resources (e.g., battery, processing power, memory) when capturing time-lapse videos.

In some implementations, at least some of the time-lapse video frames may be stabilized based on a punchout of the at least some of the time-lapse video frames. Rather than using the entire visual content of the time-lapse video frames, one or more portions of the time-lapse video frames may be punched out (using a viewing window) to provide stabilization of the visual content within the time-lapse video frames. Stabilization of visual content may be performed based on placement of the viewing window within the field of view of the visual content. Stabilization of visual content may include using smaller spatial extents of the visual content to provide a punchout view of the visual content that creates a more stable view than when viewing the entirety of the visual content.

A punchout of the visual content may refer to an output of one or more portions of the visual content for presentation (e.g., current presentation, future presentation based on video generated using the punchout). A punchout of the visual content may refer to extents of the visual content that is obtained for viewing and/or extraction. The extents of the visual content viewable/extracted within the viewing window may be used to provide views of different spatial extents of the visual content. Inclusion of the extent(s) of the visual content within the punchout/viewing window may effectuate stabilization of the visual content via selective cropping.

The placement of the viewing window may compensate for the motion (e.g., unintentional motion) of the image capture device during the capture duration. The placement of the viewing window may reduce, remove, and/or smooth the motion present in the visual content due to different translational and/or rotational positions of the image capture device when it captured the visual content. For example, a viewing window having a smaller size than the field of view of the visual content may be used to provide a punchout of the visual content. The punchout (cropped view) may be moved within the field of view to provide a stabilized view of the visual content.

The viewing window may be oriented with respect to the field of view of the visual content to provide a punchout of the visual content that is stable/smooth with respect to prior and/or next punchout of the visual content. For example, the viewing window may be oriented with respect to the field of view of images captured by the image capture device to provide a punchout of the images such that the visual content within the viewing window appears to have been captured with a stable/more stable image capture device (e.g., a punchout of a video frame being stable/more stable with a punchout of the preceding video frame and/or a subsequent video frame).

The time-lapse video frames generated by the generation component 112 may be defined by time-lapse video information. Time-lapse video information defining time-lapse video frames may define an encoded version/copy of the time-lapse video frames/time-lapse video and/or instructions for rendering the time-lapse video frames/time-lapse video. For example, the time-lapse video information may define an encoded version/copy of the time-lapse video frames/time-lapse video, and the time-lapse video information (e.g., time-lapse video file) may be opened in a video player for presentation of the time-lapse video frames/time-lapse video. The time-lapse video information may define instructions to render the time-lapse video frames/time-lapse video for presentation. For example, the time-lapse video information may define a director track that includes information as to which images and/or which visual portions of the images should be included within a presentation as time-lapse video frames/time-lapse video. A video player may use the director track to retrieve the relevant images/relative visual portions of the images when the time-lapse video is opened/to be presented.

The generation component 112 may be configured effectuate storage of the time-lapse video information and/or other information in one or more storage media. For example, the time-lapse video information may be stored in the electronic storage 13, remote storage locations (storage media located at/accessible through a server), and/or other locations. In some implementations, the generation component 112 may effectuate storage of the time-lapse video information through one or more intermediary devices. For example, the processor 11 may be located within a computing device without a connection to the storage device (e.g., the computing device lacks Wi-Fi/cellular connection to the storage device). The generation component 112 may effectuate storage of the time-lapse video information through another device that has the necessary connection (e.g., the computing device using a Wi-Fi/cellular connection of a paired mobile device, such as a smartphone, tablet, laptop, to store information in one or more storage media). Other storage locations for and storage of the time-lapse video information are contemplated.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible (non-transitory) machine-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, Li-Fi communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
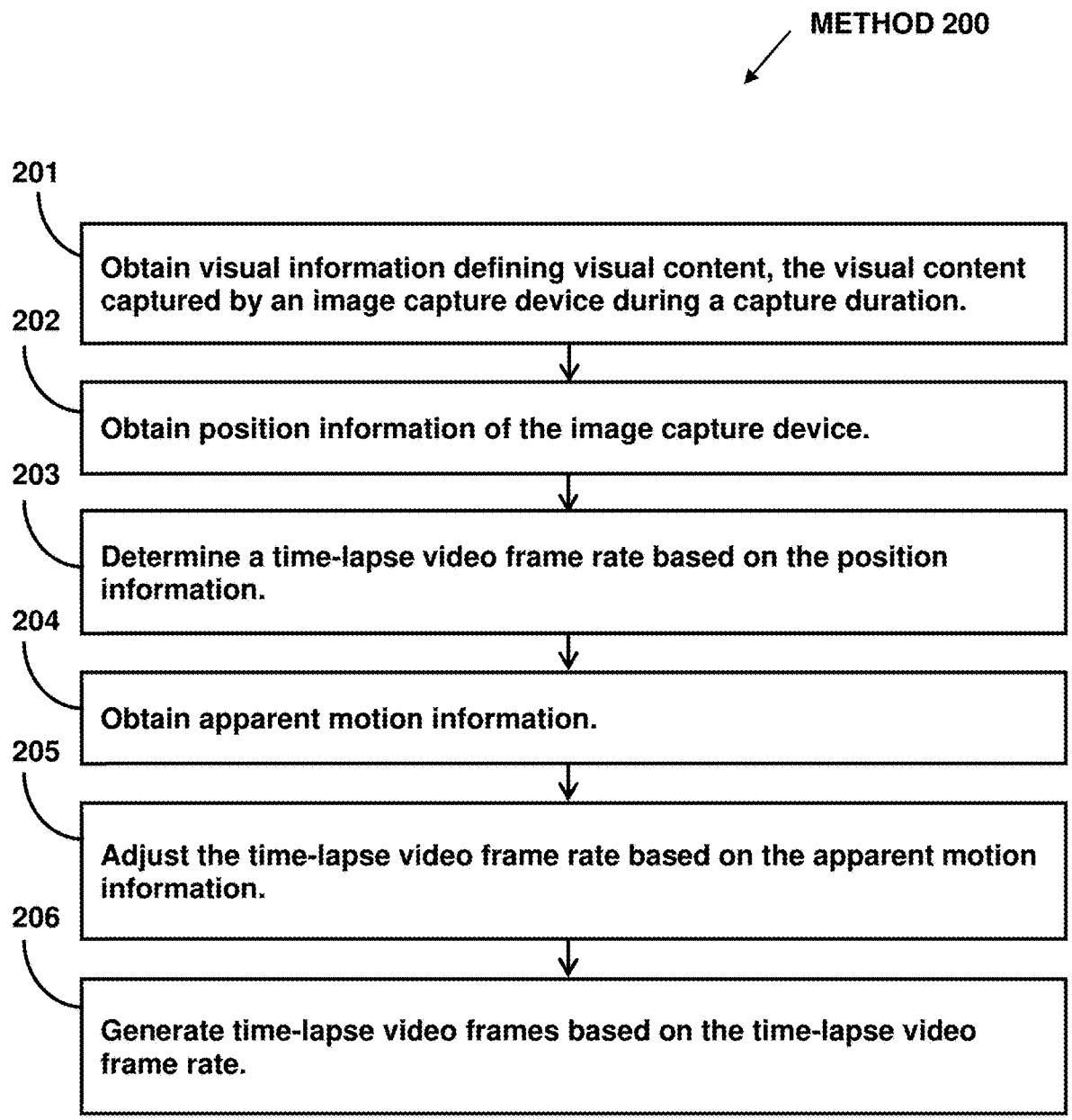
FIG. 2 illustrates an example method for generating time-lapse videos.

FIG. 2 illustrates method 200 for generating time-lapse videos. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage media. The one or more processing devices may include one or more devices configured through hardware, firmware, and/or software to be specifically designed for execution of one or more of the operations of method 200.

Referring to FIG. 2 and method 200, at operation 201, visual information may be obtained. The visual information may define visual content captured by the image capture device during a capture duration. In some implementation, operation 201 may be performed by a processor component the same as or similar to the visual information component 102 (Shown in FIG. 1 and described herein).

At operation 202, position information of the image capture device may be obtained. The position information of the image capture device may characterize positions of the image capture device during the capture duration. In some implementation, operation 202 may be performed by a processor component the same as or similar to the position information component 104 (Shown in FIG. 1 and described herein).

At operation 203, a time-lapse video frame rate may be determined based on the position information. The time-lapse video frame rate may define a rate at which time-lapse video frames are generated based on the visual content. The time-lapse video frames may include a first time-lapse video frame generated based on the visual content captured by the image capture device at a first moment within the capture duration, a second time-lapse video frame captured by the image capture device at a second moment subsequent to the first moment within the capture duration, and/or other time-lapse video frames. In some implementation, operation 203 may be performed by a processor component the same as or similar to the frame rate component 106 (Shown in FIG. 1 and described herein).

At operation 204, apparent motion information may be obtained. The apparent motion information may characterize apparent motion between pairs of two or more of the time-lapse video frames. The apparent motion information may characterize first apparent motion between the first time-lapse video frame and the second time-lapse video frame, and/or other apparent motion between other time-lapse video frames. In some implementation, operation 204 may be performed by a processor component the same as or similar to the apparent motion information component 108 (Shown in FIG. 1 and described herein).

At operation 205, the time-lapse video frame rate may be adjusted based on the apparent motion information and/or other information. In some implementation, operation 205 may be performed by a processor component the same as or similar to the adjustment component 110 (Shown in FIG. 1 and described herein).

At operation 206, the time-lapse video frames may be generated based on the time-lapse video frame rate and/or other information. In some implementation, operation 206 may be performed by a processor component the same as or similar to the generation component 112 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system that generates time-lapse videos, the system comprising:
   one or more physical processors configured by machine-readable instructions to:
      obtain visual information defining visual content, the visual content captured by an image capture device during a capture duration,
      obtain position information of the image capture device, the position information characterizing positions of the image capture device during the capture duration;
      determine a time-lapse video frame rate based on the position information, the time-lapse video frame rate defining a rate at which time-lapse video frames are generated based on the visual content, the time-lapse video frames including a first time-lapse video frame generated based on the visual content captured by the image capture device at a first moment within the capture duration and a second time-lapse video frame captured by the image capture device at a second moment subsequent to the first moment within the capture duration;
      obtain apparent motion information, the apparent motion information characterizing apparent motion between pairs of two or more of the time-lapse video frames, the apparent motion information characterizing first apparent motion between the first time-lapse video frame and the second time-lapse video frame;
      adjust the time-lapse video frame rate based on the apparent motion information; and
      generate the time-lapse video frames based on the time-lapse video frame rate.

2. The system of claim 1, wherein the position information characterizes the positions of the image capture device during the capture duration based on the position information including rotational position information, the rotational position information characterizing rotational positions of the image capture device during the capture duration.

3. The system of claim 2, wherein the position information characterizes the positions of the image capture device during the capture duration further based on the position information including acceleration information, the acceleration information characterizing accelerations of the image capture device during the capture duration.

4. The system of claim 1, wherein the one or more physical processors are, to determine the time-lapse video frame rate based on the position information, further configured by the machine-readable instructions to:
   identify a motion type of the image capture device based on the position information; and
   determine the time-lapse video frame rate based on the motion type of the image capture device.

5. The system of claim 1, wherein the one or more physical processors are, to determine the time-lapse video frame rate based on the position information, further configured by the machine-readable instructions to:
   determine an amount of field of view overlap between the visual content captured at different moments within the capture duration based on the position information; and
   determine the time-lapse video frame rate based on the amount of field of view overlap between the visual content captured at different moments within the capture duration.

6. The system of claim 1, wherein at least some of the time-lapse video frames are stabilized based on a punchout of the at least some of the time-lapse video frames.

7. The system of claim 1, wherein generation of the time-lapse video frames based on the time-lapse video frame rate includes capture of the time-lapse video frames by the image capture device based on the time-lapse video frame rate.

8. The system of claim 1, wherein the apparent motion information is determined based on optical flow between the pairs of the two or more of the time-lapse video frames.

9. The system of claim 1, wherein the time-lapse video frame rate is initially determined based on an environment in which the visual content is initially captured by the image capture device.

10. The system of claim 9, wherein the environment in which the visual content is initially captured by the image capture device is determined based on one or more of an exposure, a white balance, and/or a scene classification of the visual content initially captured by the image capture device.

11. A method for generating time-lapse videos, the method performed by a computing system including one or more processors, the method comprising:
   obtaining, by the computing system, visual information defining visual content, the visual content captured by an image capture device during a capture duration,
   obtaining, by the computing system, position information of the image capture device, the position information characterizing positions of the image capture device during the capture duration;
   determining by the computing system, a time-lapse video frame rate based on the position information, the time-lapse video frame rate defining a rate at which time-lapse video frames are generated based on the visual content, the time-lapse video frames including a first time-lapse video frame generated based on the visual content captured by the image capture device at a first moment within the capture duration and a second time-lapse video frame captured by the image capture device at a second moment subsequent to the first moment within the capture duration;
   obtaining by the computing system, apparent motion information, the apparent motion information characterizing apparent motion between pairs of two or more of the time-lapse video frames, the apparent motion information characterizing first apparent motion between the first time-lapse video frame and the second time-lapse video frame;

adjusting, by the computing system, the time-lapse video frame rate based on the apparent motion information; and generating, by the computing system, the time-lapse video frames based on the time-lapse video frame rate.

12. The method of claim 11, wherein the position information characterizes the positions of the image capture device during the capture duration based on the position information including rotational position information, the rotational position information characterizing rotational positions of the image capture device during the capture duration.

13. The method of claim 12, wherein the position information characterizes the positions of the image capture device during the capture duration further based on the position information including acceleration information, the acceleration information characterizing accelerations of the image capture device during the capture duration.

14. The method of claim 11, wherein determining the time-lapse video frame rate based on the position information includes:

identifying a motion type of the image capture device based on the position information; and determining the time-lapse video frame rate based on the motion type of the image capture device.

15. The method of claim 11, wherein determining the time-lapse video frame rate based on the position information includes:

determining an amount of field of view overlap between the visual content captured at different moments within the capture duration based on the position information; and determining the time-lapse video frame rate based on the amount of field of view overlap between the visual content captured at different moments within the capture duration.

16. The method of claim 11, wherein at least some of the time-lapse video frames are stabilized based on a punchout of the at least some of the time-lapse video frames.

17. The method of claim 11, wherein generation of the time-lapse video frames based on the time-lapse video frame rate includes capture of the time-lapse video frames by the image capture device based on the time-lapse video frame rate.

18. The method of claim 11, wherein the apparent motion information is determined based on optical flow between the pairs of the two or more of the time-lapse video frames.

19. The method of claim 11, wherein the time-lapse video frame rate is initially determined based on an environment in which the visual content is initially captured by the image capture device.

20. The method of claim 19, wherein the environment in which the visual content is initially captured by the image capture device is determined based on one or more of an exposure, a white balance, and/or a scene classification of the visual content initially captured by the image capture device.

* * * * *